Oct. 28, 1941.　　　J. L. MAULBETSCH　　　2,260,575
DRIFT MEASURING INSTRUMENT FOR AIRCRAFT
Filed July 26, 1939
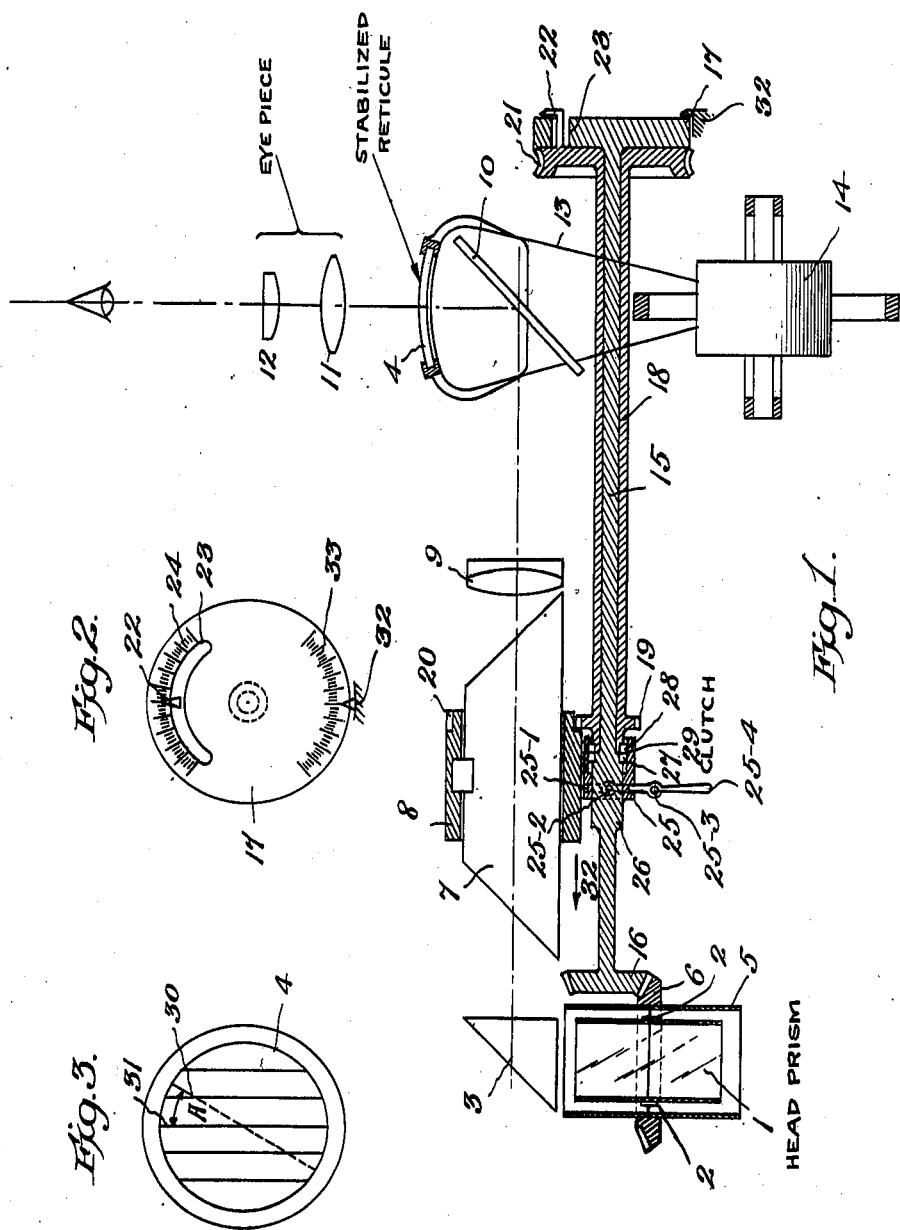
INVENTOR
JOHN L. MAULBETSCH
BY
ATTORNEY Patented Oct. 28, 1941

2,260,575

UNITED STATES PATENT OFFICE 2,260,575

DRIFT MEASURING INSTRUMENT FOR AIRCRAFT

John L. Maulbetsch, Brooklyn, N. Y., assignor to Kollmorgen Optical Corporation, Brooklyn, N. Y., a corporation of New York Application July 26, 1939, Serial No. 286,545

6 Claims. (Cl. 88—1)

The present invention relates to drift measuring devices, and, more particularly, to an improved instrument for measuring the drift of aircraft during navigation.

Heretofore, in drift measuring instruments for aircraft, it was customary to project the image of the ground on a reticule to determine the direction in which the image of some ground object travels across the reticule. This imaginary line across the reticule described by said ground object is referred to as the trail line. As those skilled in the art know, for navigational purposes, it was of great importance to determine the angle formed by this trail line with a fixed line provided on the reticule, and having a predetermined and known direction with respect to the longitudinal axis of the aircraft. However, under conditions of aircraft operation, the measurement of this angle was connected with considerable difficulties. Thus, first of all, as aircraft is greatly subject to oscillations about its main course, its longitudinal axis would not have a steady direction in space but would oscillate about a course set up by the navigator. Therefore, when the fixed line on the reticule was rigidly connected with the aircraft, this fixed line would constantly change its direction and would oscillate about the direction which it would have if the aircraft had a perfectly steady motion. It has been already suggested to stabilize the reticule in the azimuth direction for example by means of a gyroscope, so as to keep this fixed line in a constant direction in space. This suggestion, however, did not provide a solution of the problem and, as a matter of fact, has introduced a new difficulty in the measurement of the drift angle. Although also various other suggestions and proposals were made to solve the outstanding problem and to provide a completely satisfactory instrument for the measurement of drift of aircraft, none, as far as I am aware, of these various suggestions and proposals was completely satisfactory and successful when carried into practice.

I have discovered a simple and completely satisfactory solution of the problem.

It is an object of the present invention to provide a drift measuring instrument for aircraft which eliminates the disadvantages of conventional drift indicators.

It is another object of the present invention to provide a drift measuring instrument for measuring the angle between the trail line and a fixed line on the reticule in a simple, rapid and foolproof manner.

It is a further object of the invention to provide a drift measuring instrument of novel and improved character which may be added to existing installations without undue trouble and expense.

The invention also contemplates a drift measuring device for determining the drift of aircraft during navigation which is simple in construction, quick and accurate in operation and which may be manufactured on a practical and industrial scale at a low price.

Other and further objects and advantages of the present invention will become apparent from the following description taken in conjunction with the accompanying drawing, in which:

Fig. 1 illustrates a longitudinal sectional view, somewhat diagrammatic in character, of a drift measuring instrument embodying the principles of the present invention;

Fig. 2 depicts a side elevational view of the combination control knob and dial shown in Fig. 1; and Fig. 3 shows a top elevational view of the reticule of the drift measuring instrument illustrated in Fig. 1.

Broadly stated, according to the principles of the present invention, I provide a drift measuring instrument in which the direction of the reticule remains unchanged in space and the image of the ground on the reticule is rotated with respect to the reticule until the trail line is parallel to the fixed line of the reticule. In this case, the amount of rotation will be a measure of the angle between the trail line and a fixed direction in space. I accomplish this result by providing a head prism or head mirror in combination with a dove prism to project the image of the ground onto the reticule. To keep the image erect in the field of view, I gear the head prism or mirror to the dove prism in the conventional manner so that while rotating the head prism or mirror in order to project various portions of the ground into the reticule, the image will be always and automatically maintained erect. According to the principles of the invention, I provide an additional control and rotation of the dove prism so as to control the orientation of the field of view on the reticule. This can be accomplished, for example, by means of splitting the mechanical connection between the head prism and the dove prism and by providing means for selective and joint rotation of these optical elements. When the dove prism and the head prism are connected for rotation, such rotation maintains the image erect. However, when the dove prism and the head prism are disconnected, the dove prism may be rotated independently of the head prism, thus rotating the image on the reticule. The angle of rotation which will be necessary to bring the trail line in parallel with the lines on the reticule may be read on a dial cooperating or associated with the control knob for rotating the dove prism.

Referring now more particularly to the drawing, a preferred embodiment of the invention is illustrated in which a plurality of prisms 1 and 3 are provided to form a head prism system for projecting the image of the ground onto a reticule 4. Of prisms 1 and 3, 1 is mounted into a barrel-shaped member or sleeve 5 provided with a ring gear 6 for rotating the sleeve and the prisms therein around the vertical axis of the sleeve. Prism 1 also can be tilted in its barrel about an axis between points 2, 2. In view of the fact that any conventional arrangement known in the art is satisfactory and since the tilting mechanism does not form part of the present invention, no detailed description or showing of such mechanism is believed to be necessary. In front of prism 3 is located dove prism 7 which is mounted within a rotatable sleeve 8, rotation of which will cause rotation of the dove prism around its horizontal axis. After reflection in the dove prism, the image of the ground is projected onto reticule 4 by means of a system of lenses 9 and a mirror 10. The image on the reticule may be observed by the navigator by means of an eyepiece constituted of lenses 11 and 12. Reticule 4 is suspended or mounted on a member which is stabilized by means of a gyroscope 14, for example of the directional type. In view of the fact that the stabilized arrangement of the reticule by means of a gyroscope is well known in the art and does not form part of the present invention, no detailed description of same is believed to be necessary. Reticule 4 is provided with lines 31, the direction of which is parallel to the longitudinal axis of the aircraft in its normal position.

The means for adjusting the head prism and the dove prism comprise a shaft 15 having a bevel gear 16 rigidly connected therewith at one end thereof and a circular disc or knob 17 at the other end thereof. Bevel gear 16 engages a ring gear 6 and imparts rotational displacement thereto when disc 17 is rotated. The right hand portion of shaft 15 is surrounded by a sleeve 18 having a sliding fit with the shaft and having a gear 19 connected thereto or integrally formed therewith engaging a corresponding toothed portion 20 on sleeve 8. The other end of sleeve 18 has a disc or knob 21 mounted thereon, rotation of which will cause gear 19 to impart rotational displacement to sleeve 8 and to dove prism 7 within the sleeve. Disc 21 has a pointer 22 protruding through an arch-shaped slot 23. This pointer cooperates with a circular scale or dial 24 provided on disc or knob 17 above slot 23 to indicate the relative angular displacement of sleeve 18 with respect to shaft 15. Disc 21 is also provided with a second scale or dial 33 diametrically opposite to scale 24 and adapted to cooperate with a pointer 32 mounted on a stationary part of the device.

Shaft 15 and sleeve 18 may be coupled to each other by means of a clutch which may be provided in the form of a cylindrical shell 25 slideably mounted on an enlarged portion 26 of shaft 15 having the same diameter as the external diameter of sleeve 18. Keys 27 and 28 are provided in enlarged portion 26 of shaft 15 and in sleeve 18, respectively, which cooperates with keyways 29 in clutch 25 whereby shaft 15 and sleeve 18 may be connected with or may be disconnected from each other by displacement of shell or clutch 25. The displacement of clutch 25 is effected by means of a circumferential groove 25—1 provided in the shell constituting the clutch and engaged by the end 25—2 of an actuating lever 25—4, pivotally mounted in 25—3.

From the foregoing description the operation of my improved drift measuring instrument will be readily understood by those skilled in the art. When it is desired to determine the drift of the aircraft during navigation, the navigator actuates actuating lever 25—4 and clutch 25 to connect shaft 15 with sleeve 18. In this position of the clutch, as is illustrated in Fig. 1, rotation of control knob 17 or 21 will cause rotational displacement of both the head prism system 1, and of dove prism 7 by means of gear 16 engaging ring gear 6 and gear 19 engaging ring gear 20, respectively. By means of the simultaneous rotation of these two prism systems, the navigator is in a position to bring in the desired portion of the ground imaged on the reticule at all times in the erect position as the change in the position of the head prism when imaging various portions of the ground is automatically compensated for by the proper and simultaneous rotation of the dove prism. If the object on the ground is located on the flight track, its image will follow the center line of the stabilized reticule and the drift angle will be measured by the rotation of the head as given by the stationary pointer 32 on scale 33. If the object does not lie on the flight track, its image can be brought to the center of the reticule since the navigator is in a position to vary the location of the image on the reticule by rotating and tilting the head prism.

In this adjusted position of the head and dove prisms, the trail line denoted by reference character 30 in Fig. 3 encloses an angle A with fixed line 31 of reticule 4. To accurately measure this angle, all that is required is to disconnect sleeve 18 from shaft 15 by displacing clutch 25 in the direction of arrow 32 on the enlarged portion 26 of shaft 15 thereby removing keyway 29 from keys 27 and 28. In the disconnected position of sleeve 18, dove prism 7 may be individually rotated around its horizontal axis by means of rotating control knob 21, sleeve 18, gear 19 and ring gear 20 until trail line 30 will be parallel with or will cover fixed line 31 on reticule 4. The relative angular displacement of discs 17 and 21, as clearly indicated by pointer 22 on dial 24, will then, in connection with the angle of rotation of the head prism as clearly indicated by pointer 32 on scale 33, be a measure of the drift angle of the aircraft.

Although the present invention has been described in connection with a preferred embodiment thereof, variations and modifications may be resorted to by those skilled in the art without departing from the principles of the present invention. Thus, the measurement of the angle enclosed by the trail line with a fixed line of the reticule may be accomplished in similar manner by projecting the reticule into the field of view; the orientation of the image of the reticule in the field of view being controlled by means of a dove prism. Likewise, a differential gear mechanism may be employed for displacing the head prism and the dove prism individually or in combination. It is also possible to have the main optical axis of the device in the vertical direction instead of the horizontal direction illustrated in the described preferred embodiment. I consider all of these variations and modifications as within the true spirit and scope of the present invention as disclosed in the foregoing description and defined by the appended claims.

I claim:

1. In a drift measuring instrument for aircraft, the combination comprising a stabilized reticule having parallel lines thereon, an optical system including a head prism mounted for rotation around a vertical axis for projecting the image of the ground onto said reticule, a dove prism mounted for rotation around a horizontal axis for maintaining said image erect on the reticule, means for rotating said head prism, means for rotating said dove prism, a clutch inbetween said head prism and said dove prism rotating means, said clutch being adapted to couple said head and dove prism rotating means for collective rotation for projecting selected portions of the ground onto said reticule in the erect position, and means for disabling said clutch to permit selective rotation of said dove prism and to bring the trail line described by a point of the ground on the reticule into a parallel position with the lines on said reticule, the angle of rotation of said dove prism being a measure of the drift angle.

2. In a drift measuring instrument for aircraft, the combination comprising a reticule having parallel lines thereon, a gyroscope for stabilizing said reticule in space, a vertical sleeve mounted for rotation around its axis, a head prism system in said vertical sleeve for projecting the image of the ground onto said reticule, a horizontal sleeve mounted for rotation around its axis, a dove prism in said horizontal sleeve for maintaining said image erect on the reticule, means for rotating said vertical sleeve, means for rotating said horizontal sleeve, a clutch interposed between said rotating means, means for actuating said clutch to cause collective rotation of said head and of said dove prisms for projecting selected portions of the ground onto said reticule in the erect position, and means for disabling said clutch to permit selective rotation of said dove prism and to bring the trail line described by a point of the ground on the reticule into a parallel position with the lines on said reticule, the angle of rotation of said dove prism being a measure of the drift angle.

3. In a drift measuring instrument for aircraft, the combination comprising a reticule having parallel lines thereon, a vertical sleeve mounted for rotation around its axis, a head prism system in said vertical sleeve for projecting the image of the ground onto said reticule, a horizontal sleeve mounted for rotation around its axis, a dove prism in said horizontal sleeve for maintaining said image erect on the reticule, means including a ring gear and a shaft for rotating said vertical sleeve, means including a ring gear and an elongated sleeve for rotating said horizontal sleeve, a cylindrical clutch surrounding an intermediate portion of said shaft and said sleeve, means for displacing said clutch in the axial direction to couple said shaft and said elongated sleeve to cause collective rotation of said head and of said dove prism for projecting selected portions of the ground onto said reticule in the erect position, means for disabling said clutch to permit selective rotation of said dove prism and to bring the trail line described by a point of the ground on the reticule into a parallel position with the lines on said reticule, and means indicating the relative displacement of said shaft and of said elongated sleeve whereby a measure of the drift angle is provided.

4. In a drift measuring instrument for aircraft, the combination comprising a reticule having parallel lines thereon, a vertical sleeve mounted for rotation around its axis, a head prism system in said vertical sleeve for projecting the image of the ground onto said reticule, a horizontal sleeve mounted for rotation around its axis, a dove prism in said horizontal sleeve for maintaining said image erect on the reticule, means including a ring gear on said vertical sleeve and a bevel gear with a shaft for rotating said vertical sleeve, means including a ring gear on said horizontal sleeve and a gear with an elongated sleeve surrounding said shaft for rotating said horizontal sleeve, a cylindrical clutch surrounding an intermediate portion of said shaft and said elongated sleeve, actuating means for said clutch adapted to couple said shaft and said elongated sleeve to cause collective rotation of said head and of said dove prisms for projecting selected portions of the ground onto said reticule in the erect position, means for disabling said clutch to permit selective rotation of said dove prism and to bring the trail line described by a point of the ground on the reticule into a parallel position with the lines on said reticule, and a dial and a pointer respectively associated with said shaft and said elongated sleeve to indicate the relative displacement thereof whereby a measure of the drift angle is provided.

5. In a drift measuring instrument for aircraft, the combination comprising a stabilized reticule, means for projecting the image of selected portions of the ground onto said reticule, means for adjusting said projecting means, means for maintaining said image erect on the reticule, means for simultaneously operating the projecting means and the erecting means, means for operating the projecting means and the erecting means individually, and means for disabling said connecting means to permit selective control of the position of said erecting means, thereby to bring the trail line described by a point of the ground on the reticule into a parallel position with lines on said reticule.

6. In a drift measuring instrument for aircraft, the combination comprising a stabilized reticule having a plurality of parallel lines thereon, rotatable means for projecting the image of portions of the ground onto said reticule, rotatable erecting means for said projecting means, means for independently and for simultaneously rotating said projecting and said erecting means, comprising clutch means for connecting both rotating means for simultaneous operation to project different portions of the ground onto said reticule in the erect position, and means for temporarily disabling said clutch means to permit selective rotation of said erecting means thereby to bring the trail line described by a point of the ground on the reticule into a parallel position with the lines on said reticule and thus to provide a measure of the drift angle.

JOHN L. MAULBETSCH.